(12) United States Patent
Saini et al.

(10) Patent No.: US 11,426,957 B2
(45) Date of Patent: Aug. 30, 2022

(54) FLEXIBLE CAUL AND METHOD OF MAKING THE SAME

(71) Applicant: The Boeing Company, Chicago, IL (US)

(72) Inventors: Gagandeep Saini, Snohomish, WA (US); Lisa Christina Carlson, Auburn, WA (US); Jonathan Santiago, Seattle, WA (US); Kurtis Shuldberg Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 16/600,925

(22) Filed: Oct. 14, 2019

(65) Prior Publication Data
US 2021/0107239 A1 Apr. 15, 2021

(51) Int. Cl.
*B29C 70/54* (2006.01)
*B29C 33/38* (2006.01)

(52) U.S. Cl.
CPC .......... *B29C 70/54* (2013.01); *B29C 33/3842* (2013.01)

(58) Field of Classification Search
CPC ................ B29C 33/3842; B29C 70/54; B29C 2043/3655; B29C 43/36; B29C 70/44; B29C 70/443; B29C 70/541; B29C 70/682; B29C 70/78
USPC ....................................................... 425/470
See application file for complete search history.

(56) References Cited

U.S. PATENT DOCUMENTS

| | | | |
|---|---|---|---|
| 5,387,098 A * | 2/1995 | Willden | B29C 33/50 264/257 |
| 7,527,759 B2 | 5/2009 | Lee et al. | |
| 8,465,613 B2 | 6/2013 | Rotter et al. | |
| 8,795,567 B2 | 8/2014 | Bland | |
| 8,997,642 B2 | 4/2015 | Stewart et al. | |
| 9,387,628 B2 | 7/2016 | Chapman et al. | |
| 2012/0076973 A1* | 3/2012 | Guzman | B29C 70/304 428/113 |
| 2013/0036922 A1* | 2/2013 | Stewart | B30B 11/001 100/35 |
| 2014/0087143 A1 | 3/2014 | Pacchione et al. | |
| 2017/0095983 A1* | 4/2017 | Offensend | B64C 1/06 |

FOREIGN PATENT DOCUMENTS

| | | |
|---|---|---|
| EP | 2441571 A1 | 4/2012 |
| EP | 3115185 A1 | 1/2017 |

OTHER PUBLICATIONS

European Patent Office Extended Search Report, dated Feb. 24, 2021, regarding Application No. 20200869.4, 9 pages.
Saini et al., "Constrained Creep Forming of Contoured Composite Stiffeners," U.S. Appl. No. 16/600,887, filed Oct. 14, 2019, 52 pages.

* cited by examiner

*Primary Examiner* — Yunju Kim
(74) *Attorney, Agent, or Firm* — Yee & Associates, P.C.

(57) ABSTRACT

A flexible caul for applying pressure to a part comprises a caul member having a plurality of spaced apart gaps therein to provide the caul member with flexibility, and a flexible covering that limits flexing of the caul member.

20 Claims, 15 Drawing Sheets

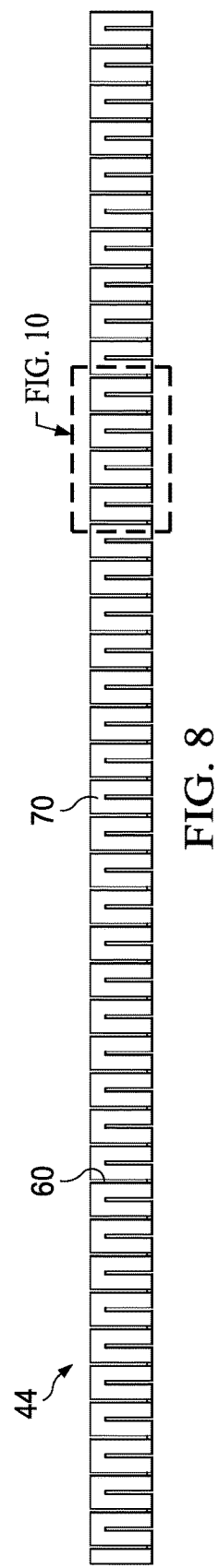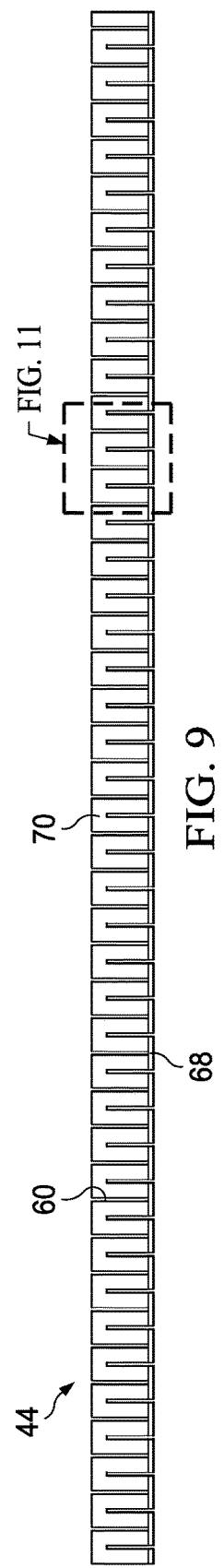

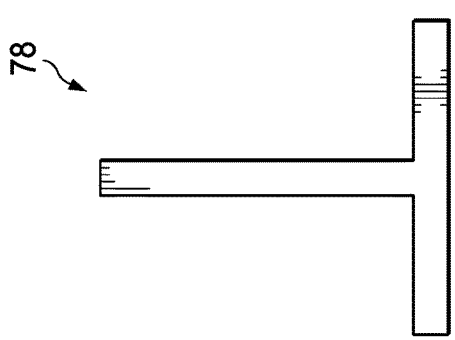
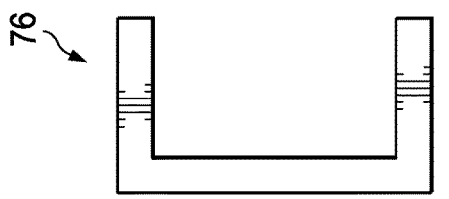
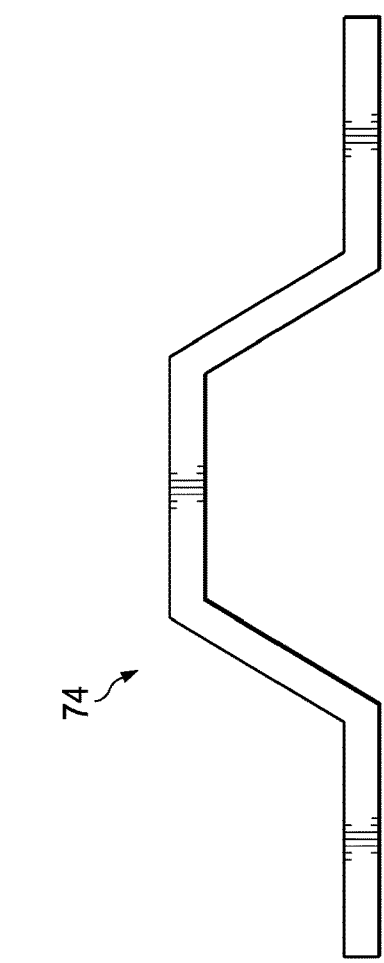
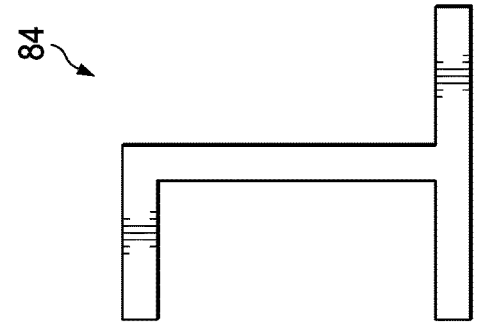
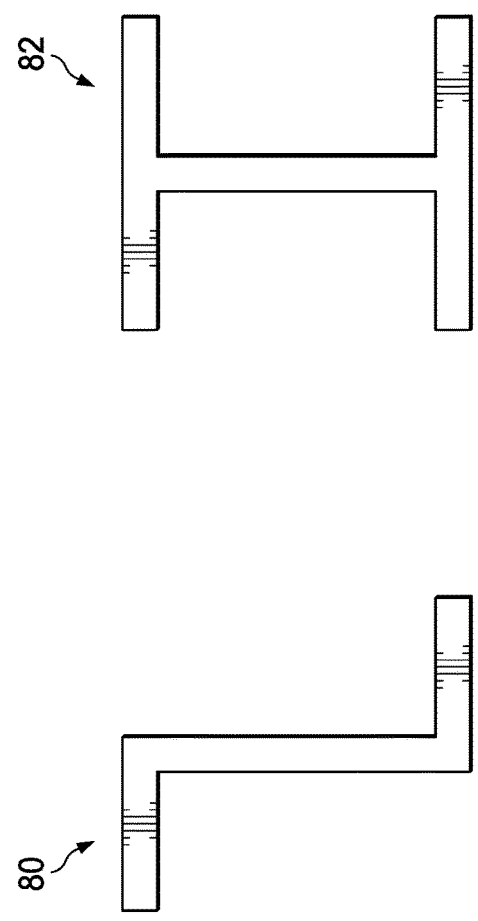

FLEXIBLE CAUL AND METHOD OF MAKING THE SAME

CROSS REFERENCE TO RELATED APPLICATIONS

This application is related to co-pending U.S. patent application Ser. No. 16/600,887, filed concurrently herewith on Oct. 14, 2019, which is incorporated by reference herein in its entirety.

BACKGROUND INFORMATION

1. Field

The present disclosure generally relates to manufacturing of composite parts, and deals more particularly with a flexible caul used to form or compact contoured composite laminates.

2. Background

Tools commonly referred to as cauls are sometimes used during compaction of a composite laminate structure (hereinafter referred to as a "part") to evenly distribute compaction forces and/or to achieve a desired part surface finish. Cauls used to compact composite laminate parts that are contoured and/or have uneven thicknesses require that the cauls have contours and/or surface profiles that match those of the part being compacted. The cauls used in these applications must be custom made and are suitable for use with only those parts for which they are designed. The need for custom made cauls adds to production costs and may increase production flow times.

Accordingly, it would be desirable to provide cauls that are flexible, allowing them to be reconfigured for use in compacting, curing and/or forming composite laminate part having differing geometries.

SUMMARY

The disclosure relates in general to cauls used in manufacturing composite laminate parts, and more specifically to a flexible caul that can be reconfigured for use in compacting, curing and/or forming composite laminate parts.

According to one aspect, a flexible caul is provided for applying pressure to a part. The flexible caul includes a caul member and a flexible covering over the caul member. The caul member is configured to be placed against the part and includes a plurality of spaced apart gaps therein to provide the caul member with flexibility. The flexible covering surrounds the caul member and is configured to limit flexing of the caul member.

According to another aspect, a configurable tool is provided for forming a part. The configurable tool includes a tool member formed of a rigid material and having surfaces configured to engage the part. The tool member has a length and includes a plurality of spaced apart gaps therein along the length. The plurality of spaced apart gaps form flexible zones to allow the tool member to flex to a desired shape. The configurable tool further includes a flexible material to fill the plurality of spaced apart gaps such that flexing of the tool member is limited.

According to still another aspect, a method is provided of making a flexible tool. The method includes producing a tool member formed of a rigid material and having a length, and forming a plurality of gaps in the tool member at spaced apart locations along the length to allow the tool member to flex. The method also includes covering the tool member with a flexible material that limits flexing of the tool member.

One of the advantages of the disclosed flexible caul is that it may be readily reconfigured to match the geometry of different composite laminate parts that possess contours, variations in thickness, or other non-uniform surface features. Accordingly, process flow times as well as material and labor costs may be reduced by avoiding the need for multiple fixed caul geometries. Another advantage of the disclosed flexible caul is that it is simple in construction, durable, relatively easy to manufacture, and is suitable for a wide range of applications. Still another advantage is that the disclosed flexible caul may also be used as a tool for forming composite laminate layups into parts, such as composite laminate stiffeners that are contoured and/or contain thickness variations along their lengths.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative example of the present disclosure when read in conjunction with the accompanying drawings, wherein:

FIG. 8 is an illustration of an elevational view of one side of the caul member shown in FIG. 7.

FIG. 9 is an illustration of an elevational view of the other, opposite side of the caul member.

FIGS. 16-21 are illustrations of cross-sectional views of alternate forms of the flexible caul.

DETAILED DESCRIPTION

Figure 1:
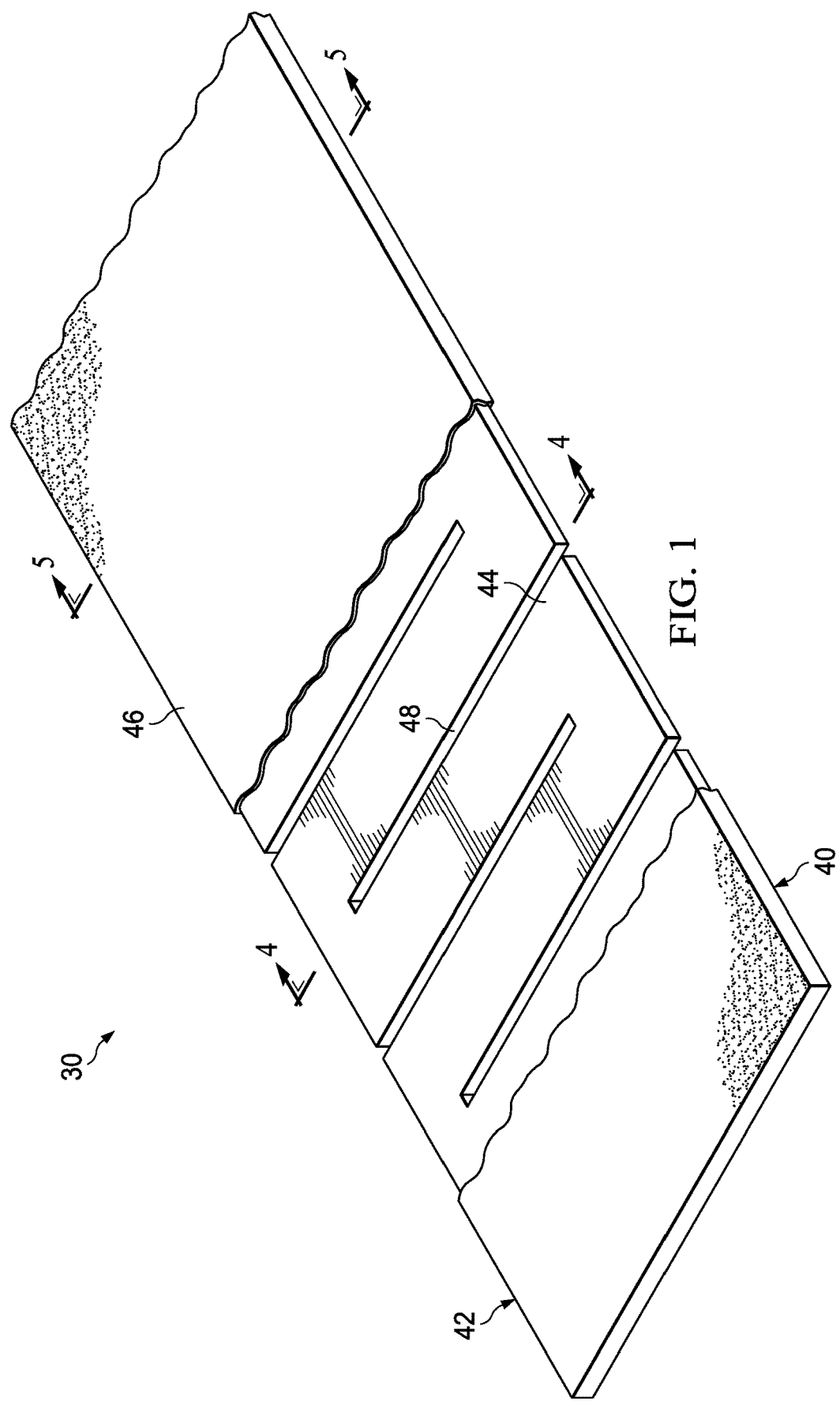
FIG. 1 is an illustration of a side elevational view of a tool on which a composite laminate structure is being compacted using a flexible caul and vacuum bag processing.

Referring to FIG. 1, the disclosed examples relate to a flexible caul 30 useful in compacting contoured or curved composite parts to achieve a desired surface finish and/or assure that the compaction forces are evenly applied. As will be discussed below in more detail, the flexible caul 30 is capable of flexing to conform to curvatures, contours or other non-uniform surface features of a composite part or a tool surface. Due to its flexibility, the flexible caul 30 may be readily reconfigured for use with parts having differing geometries. In the example shown in FIG. 1, the flexible caul 30 is substantially flat and possesses a rectangular cross-sectional profile, however a wide variety of other cross-sectional profiles are possible, depending on the application.

Figure 2:
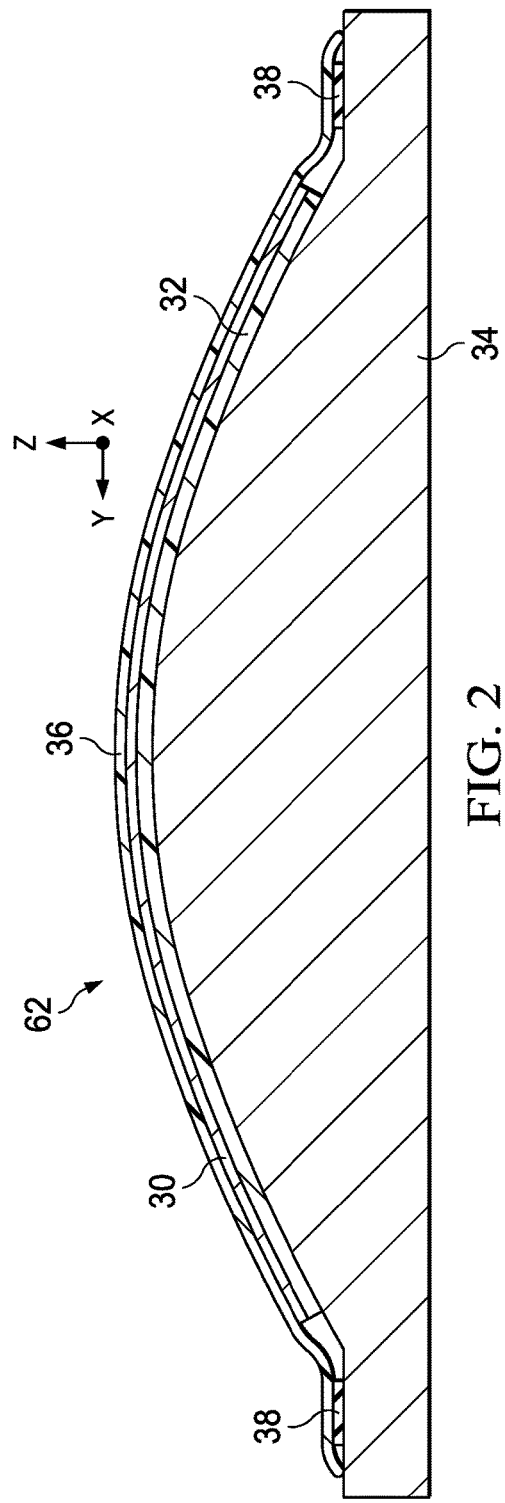
FIG. 2 is an illustration of a top plan view of the tool shown in FIG. 1, parts being broken away to reveal the flexible caul and an underlying composite laminate part.
Figure 3:
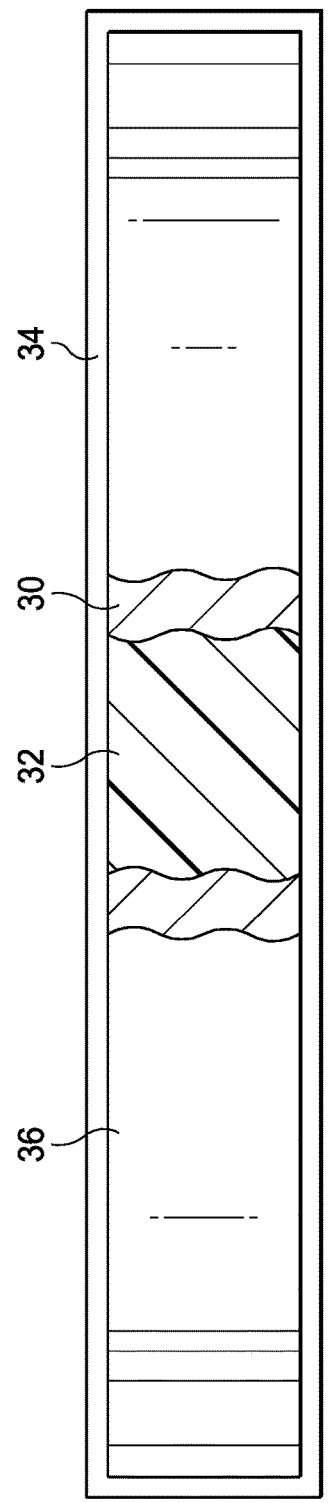
FIG. 3 is an illustration of a perspective view of the flexible caul shown in FIGS. 1 and 2, parts of a flexible covering being broken away to reveal the caul member.
Figure 4:
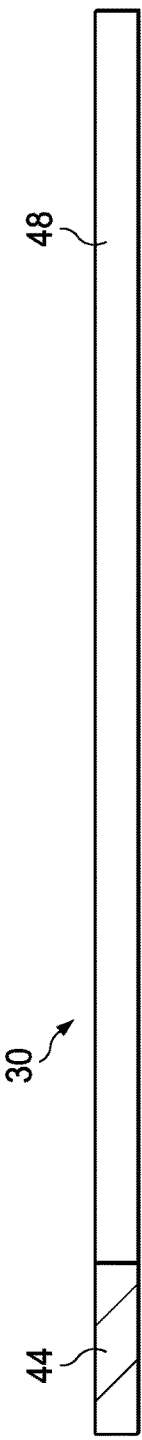
FIG. 4 is an illustration of a sectional view taken along the line 4-4 in FIGS. 1 and 6.
Figure 5:
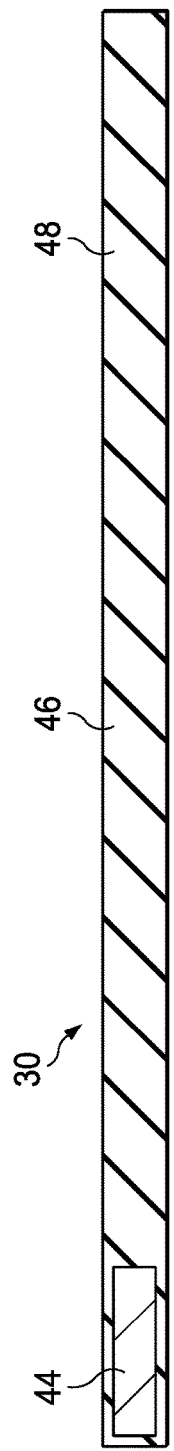
FIG. 5 is an illustration of a sectional view taken along the line 5-5 in FIG. 1.

FIGS. 2 and 3 illustrate a typical application of the flexible caul 30 shown in FIG. 1 during vacuum bag compaction of a composite part 32 against a curved tool 34 which may be a layup or cure tool. In this example, the composite part 32 may comprise a composite laminate layup or preform to which compaction force is applied by a vacuum bag 36 that is sealed around its periphery to the curved tool 34 by sealing tape 38. The composite part 32 may comprise any of a variety of composite materials, such as, without limitation, a fiber reinforced matrix, such as a thermoset, a thermoplastic or a hybrid material system containing both a thermoset and a thermoplastic. In this particular application, the flexible properties of the essentially flat flexible caul 30 shown in FIG. 1 allow it to be flexed by hand or other means to substantially match the curvature of the composite part 32, and the underlying tool surface which is curved in the YZ plane within the coordinate system indicated at 62 in FIG. 2. For simplicity of illustration, additional components typically used in vacuum bag compaction processing are not shown, such as peel plies, breathers, bleeders, release films, vacuum connections, and others. After the compaction and/curing process is completed, the profile of the flexible caul 30 may be reconfigured simply by bending or flexing it into a desired shape matching that of another composite part 32, or a tool having a different profile.

Referring now to FIGS. 1 and 4-6, the flexible caul 30 broadly comprises a caul member 44 encased within a flexible covering 46. The caul member 44 may comprise a substantially rigid material suitable for the application, including but not limited to metals, fiber products and composites to name only a few. In the illustrated example, the caul member 44 is a rigid fiber reinforced composite laminate but which, depending on the geometry of its features and their thicknesses, is capable of some degree of flexing when subjected to bending forces.

Figure 6:
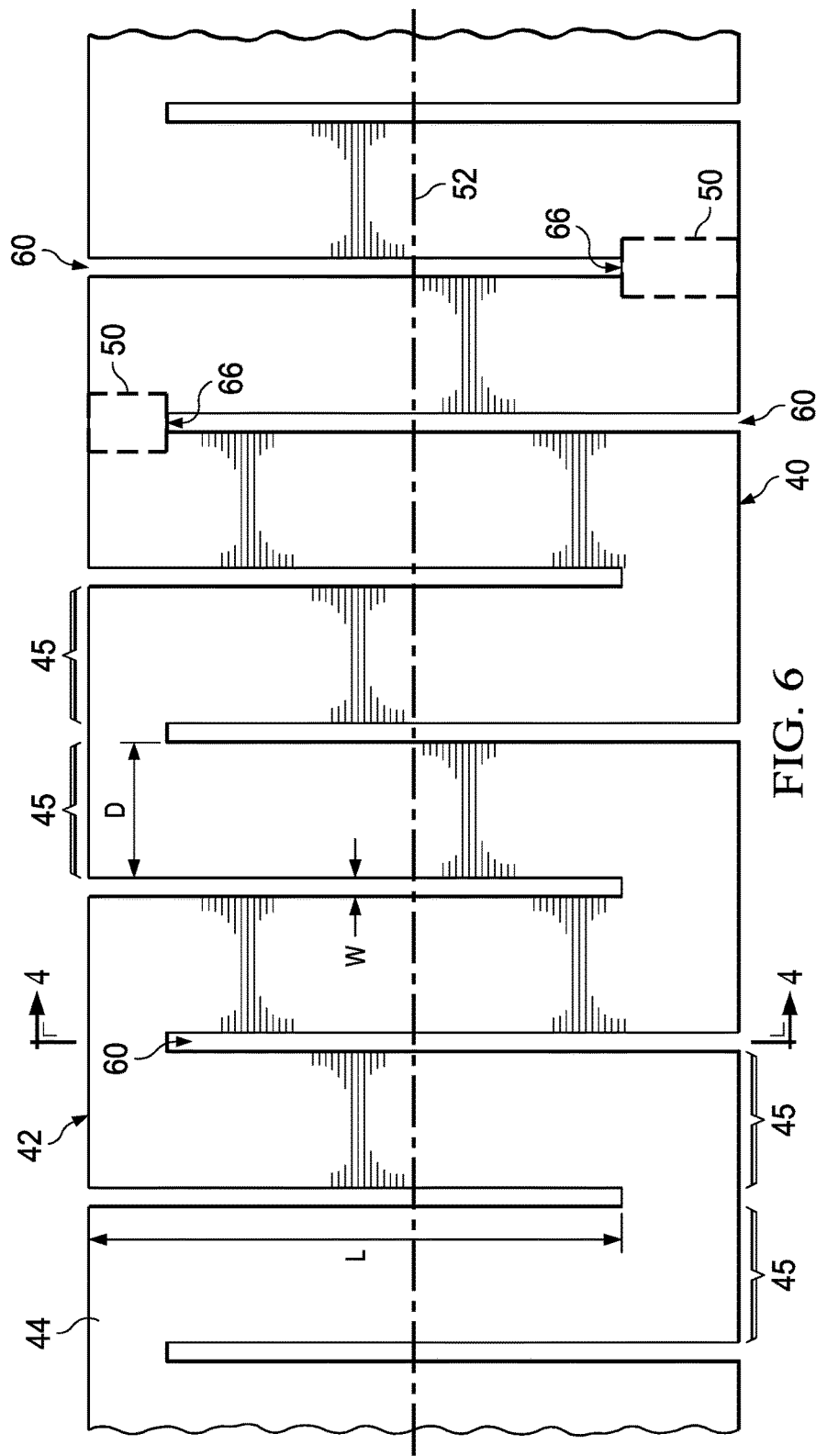
FIG. 6 is an illustration of a fragmentary, top plan view of a section of the caul member shown in FIG. 1.
Figure 7:
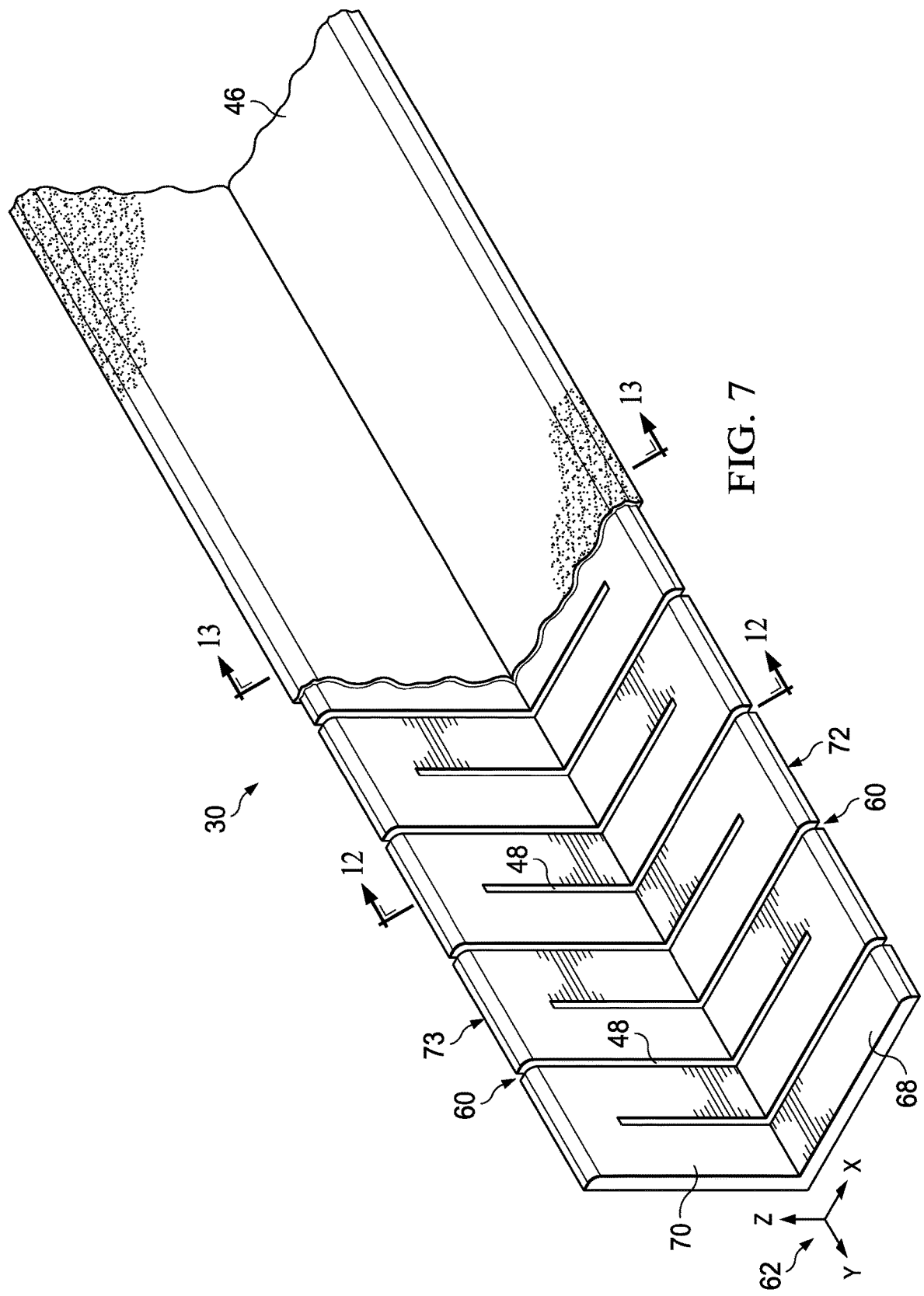
FIG. 7 is an illustration of a fragmentary, perspective view of an alternate example of the flexible caul, sections of the flexible covering being broken away to better reveal features of the caul member.

The caul member 44 includes a plurality of spaced apart gaps 48 therein along its length which divide the caul into hinged segments 45 that provide the flexible caul with flexibility. As best seen in FIG. 6, in one example, the spaced apart gaps 48 may comprise slits 60 which extend from first and second opposite side 40, 42 respectively inwardly beyond the centerline 52 of the caul member 44. The selection of the length L and width W of the slits 60, and the distance D between them will depend on the particular application, but should be sufficient to allow the caul member 44 to bend or flex to the degree required for the application. In the illustrated example, the slits 60 are regularly spaced from each other and have the same lengths L and widths W, however, in other examples the slits 60 may be spaced irregularly and have differing lengths L and widths W. Furthermore, while the slits 60 extend parallel to each other in this example, they may not be parallel to each other in order to meet the requirements of other particular applications. Also, while the slits 60 extend substantially perpendicular to the longitudinal axis of the caul member 44 in the illustrated example, they may be oriented off-axis at any angle that best suits the requirements of a particular application. For example, since potential ply wrinkles tend to be formed perpendicular to the longitudinal axis of the flexible caul 30, an off axis orientation of the slits 60 such that the slits 60 do not line-up with the wrinkles may reduce a build-up of ply wrinkling.

The slits 60 are arranged along the length of the caul member 44 such that they extend inwardly from alternating sides 40, 42 of the caul member 44. The slits terminate at end points 66 that are spaced from an adjacent one of the first and second sides 40, 42. The segments 45 are hinged together at flexible zones 50 located at the ends of the slits 60. Each of the flexible zones 50 effectively forms a flexure bearing, sometimes commonly referred to a living hinge, in which the hinge material is made from the same two rigid pieces that it connects. It should be noted here that while the spaced apart gaps 48 comprise slits 60 in the illustrated example, other gap geometries are possible.

The flexible covering 46 may comprise a suitable elastomer that is capable of adhering to the surfaces of the caul member 44 and remains flexible without degradation when subjected to the processing temperatures encountered in the particular application. By way of example, and without limitation, the flexible covering 46 may comprise a material combination of tetrafluoroethylene and propylene, such as AFLAS®. The flexible covering 46 fills the slits 60 and effectively forms hinges between the segments 45, which along with the flexible zones 50 between the segments 45, allow the caul member 44 to flex and bend with multiple degrees of freedom. However, the flexible covering 46 also prevents the flexible caul 30 from overflexing which may otherwise render the flexible caul 30 difficult to handle and manipulate. The flexible covering 46 fills the slits 60 to provide the flexible caul 30 with a substantially smooth outer surface 58 that reduces or eliminates potential mark off on the finished composite part that might otherwise be caused by the openings formed by the slits 60.

Attention is now directed to FIGS. 7-14, which illustrate another example of the flexible caul 30 having an L shaped cross section formed by a flange 68 and a web 70. The flexible caul 30 shown in this example comprises a caul member 44 encased in a flexible covering 46, both of which may be formed of materials such as those used in the flexible caul 30 shown in FIGS. 1-6. Spaced apart gaps 48 which may be in the form of slits 60 in the flanges 68 extend inwardly from the outer edge 72 of the flanges 68 and partially through the web 70. Similarly, spaced apart gaps 48 also in the form of slits 60 in the web 70 extend inwardly from the outer edge 73 of the web 70 and partially through the flange 68.

As in the example previously described, the two sets of slits 60 originating from the two edges 72, 73 are arranged in alternating relationship to each other. "Alternating relationship" refers to the fact that adjacent ones of the slits 60 originate from different ones of the edges 72, 73. The length, width and spacing of the slits 60 will vary with the application, but are chosen such that the flexible caul 30 has a flexibility that is sufficient for the particular application. Similarly, the thickness $T_1$ (FIG. 14) of the caul member 44 relative to the thickness $T_2$ of the flexible covering 46 will depend upon the particular application.

Figure 10:
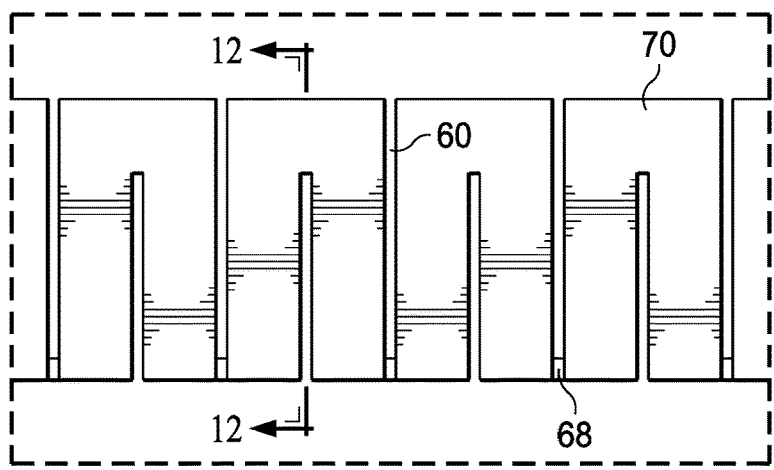
FIG. 10 is an illustration of the area designated as "FIG. 10" in FIG. 8.
Figure 10A:
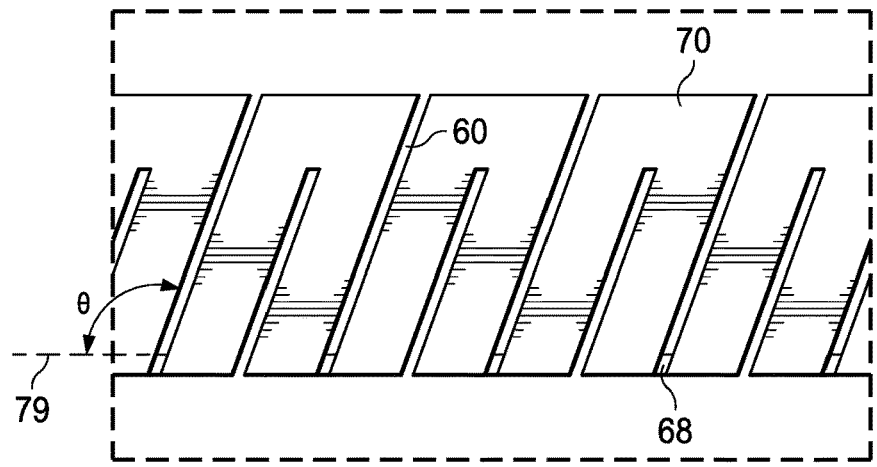
FIG. 10A is an illustration similar to FIG. 10, but showing an alternate example in which the slits are oriented off-axis.
Figure 11:
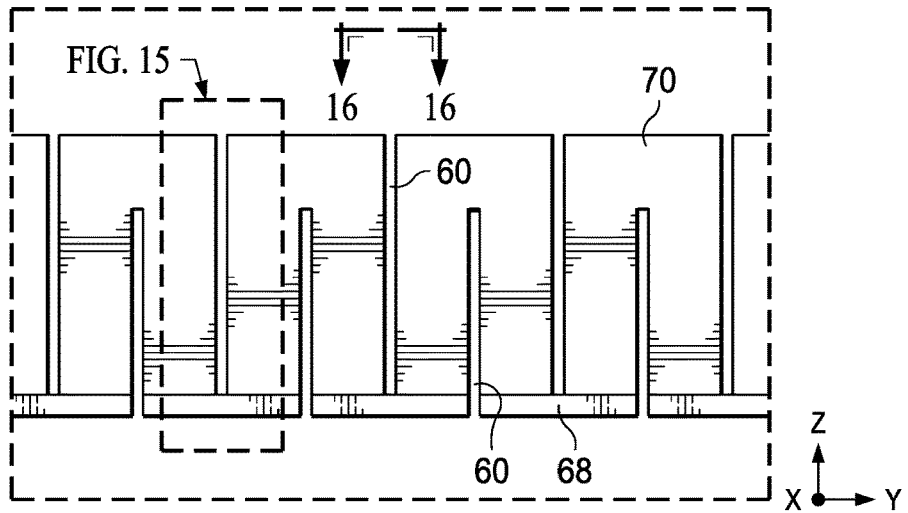
FIG. 11 is an illustration of the area designated as "FIG. 11" in FIG. 9.
Figure 12:
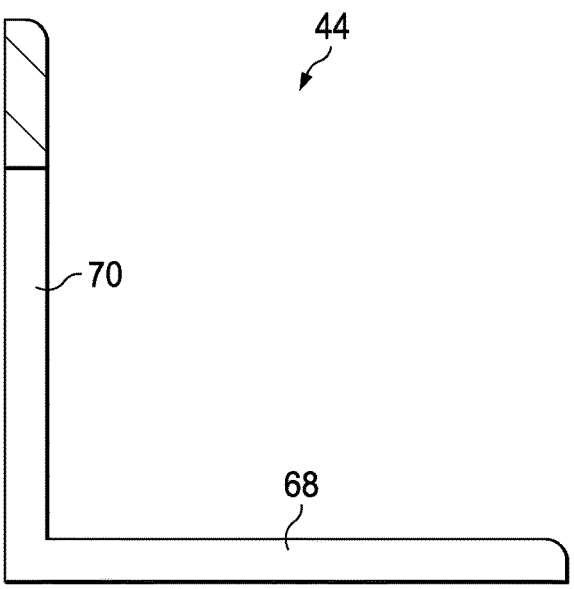
FIG. 12 is an illustration of a sectional view taken along the line 12-12 in FIGS. 7 and 10.
Figure 13:
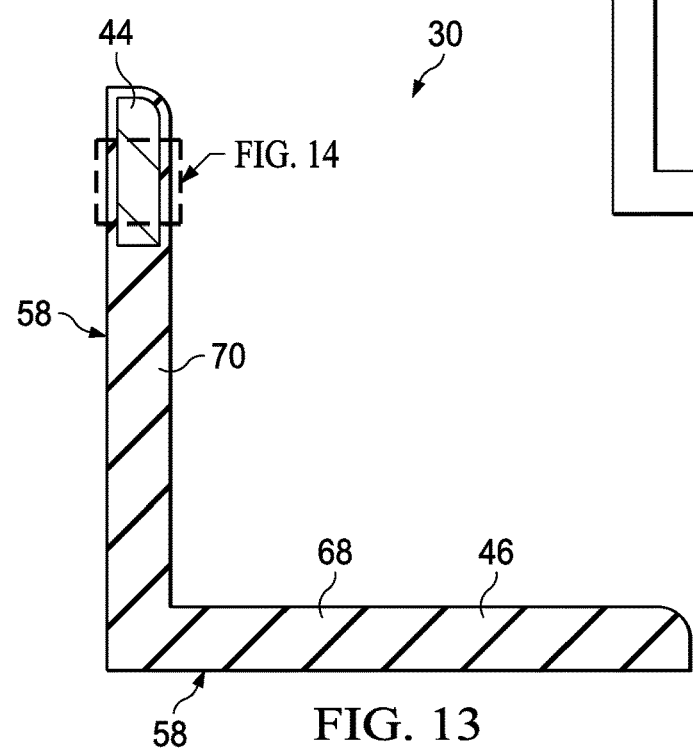
FIG. 13 is an illustration of a sectional view taken along the line 13-13 in FIG. 7.
Figure 14:
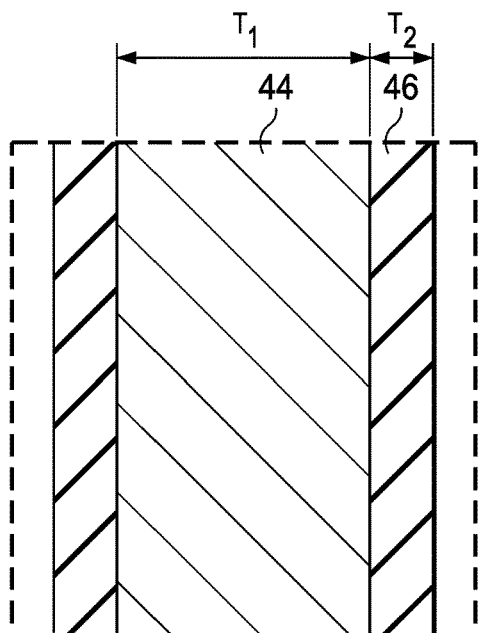
FIG. 14 is an illustration of the area designated as "FIG. 14" in FIG. 13.

In the example shown in FIGS. 7-15, the slits extend parallel to each other and are oriented perpendicular to the longitudinal axis of the caul member 44. However, other angular orientations of the slits 60 are possible, and all of the slits 60 may not be parallel to each other. For example, as shown in FIG. 10A, some or all of the slits 60 may be oriented at an angle A relative to the longitudinal axis 79 of the caul member 44. This off-axis orientation of the slits 60 may increase the areal slit coverage of caul member 44 which increases its flexibility, while avoiding alignment of the slits 60 with potential wrinkles that can lead to higher levels of wrinkling. Moreover, the angular orientation of the slits 60 may vary along the length of the caul member 44 in order to suit the requirements of a particular application, such as to reduce localized accumulations of ply wrinkling.

Figure 15B:
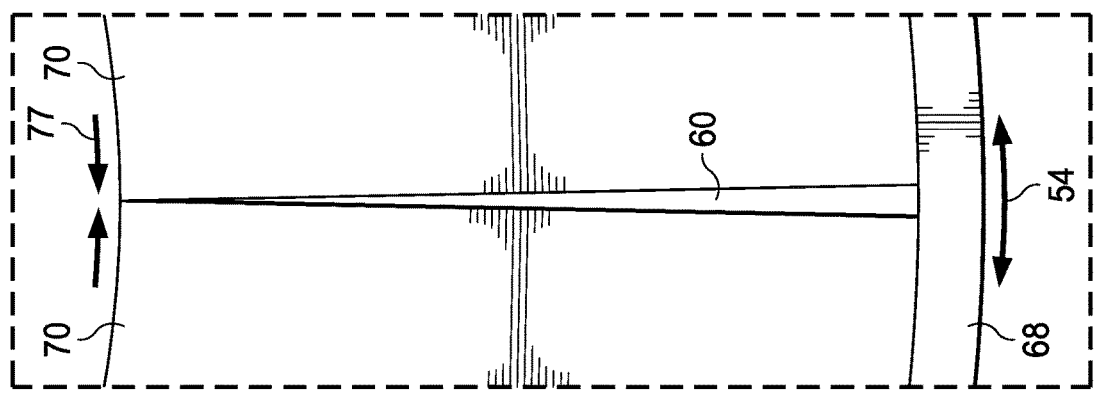
FIGS. 15A and 15B are illustrations similar to FIG. 15 but showing changes in the geometry of a slit due to flexing of the caul member.
Figure 15A:
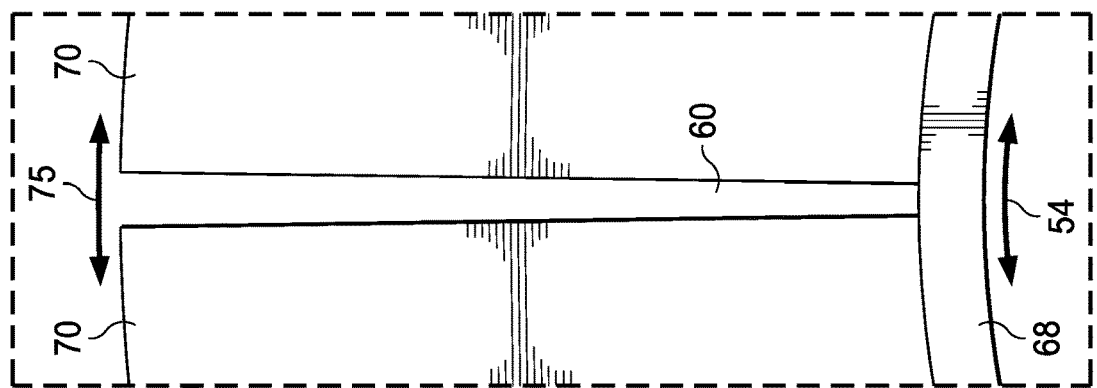
Figure 15:
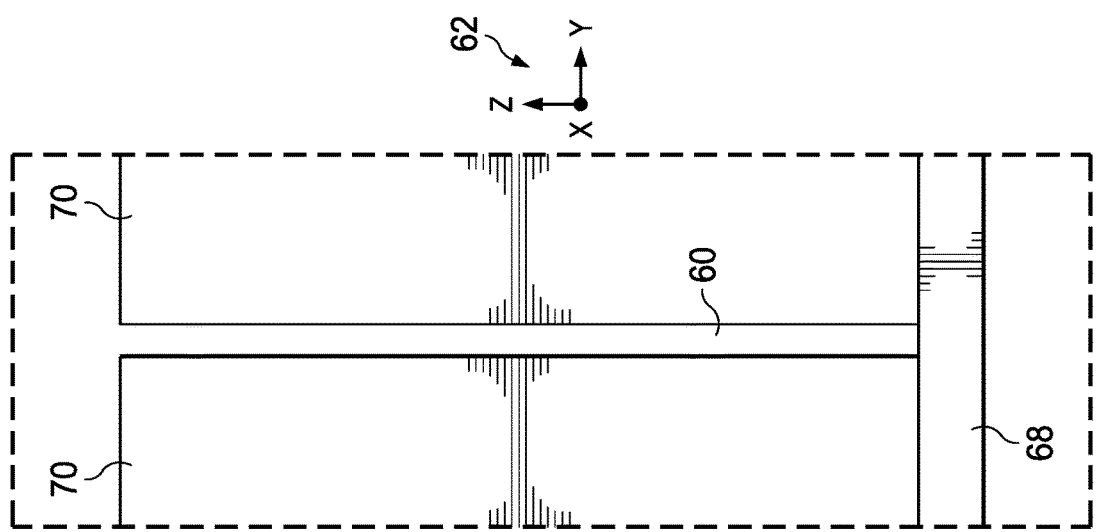
FIG. 15 is an illustration of the area designated as "FIG. 15" in FIG. 11, prior to the caul member being flexed.

Referring to FIGS. 15, 15A and 15B, bending, flexing and or twisting of the flexible caul 30 in multiple planes is facilitated by opening or closing (widening or narrowing) of the slits 60. For example, when the flexible caul 30 bends or flexes 54 in one direction within the YZ plane (FIG. 15), the slits 60 in the web 70 and/or the flange 68 may spread open 75 (FIG. 15A), while bending or flexing 54 in the opposite direction may cause the slits 60 to close 77 (FIG. 15B).

Principles of the disclosed examples may be employed to fabricate flexible cauls 30 having any of a variety of cross sectional shapes such as, without limitation, a hat shape 74 (FIG. 16), a C shape 76 (FIG. 17), an inverted T shape 78 (FIG. 18), a Z shape (FIG. 19), an I-shape 82 (FIG. 20), and an inverted J shape 84 (FIG. 21).

Figure 22:
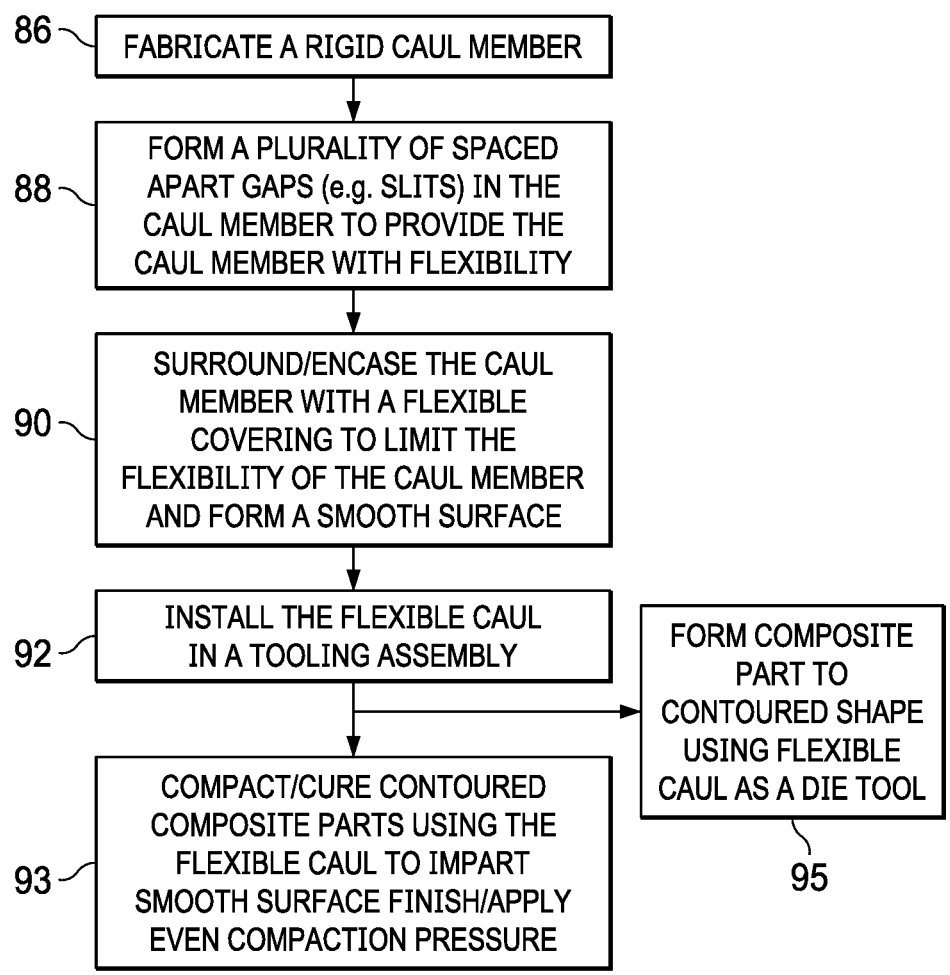
FIG. 22 is an illustration of a flow diagram of a method of making and using the flexible caul.

Referring now to FIG. 22, the flexible caul 30 may be produced by fabricating a caul member 44 at 86 using any of a variety of techniques, depending upon the composition of caul member 44. For example, a composite caul member 44 may be fabricated by laying up, forming, and curing plies of prepreg, which may comprise, for example and without limitation, a fiber reinforced thermoset or thermoplastic. At 88, a plurality of spaced apart gaps 48 such as slits 60 are made in the caul member 44 using any of a variety of techniques such as by sawing, cutting or molding. At 90, the caul member 44 is surrounded or encased with a flexible covering 46 in order to limit the flexibility of the flexible caul 30 and/or to provide it with a smooth outer surface that will substantially prevent mark off when the flexible caul 30 is used to compact or form a composite part. The flexible covering 46 may be applied to the caul member 44 by spraying it with a suitable flexible material, or by dipping or insert-molding the caul member 44 in the flexible material. At 92, the flexible caul 30 is installed in a tooling assembly that may be used to form, debulk, compact and/or cure a composite part. In one application, at 93 the flexible caul 30 is used to compact or cure a contoured composite part in order to impart a smooth surface finish substantially free of mark-off or apply even compaction pressure to the part. Alternatively, at 95, the flexible caul 30 may be used as a die tool to form a composite part to a desired contoured shape.

Figure 23:
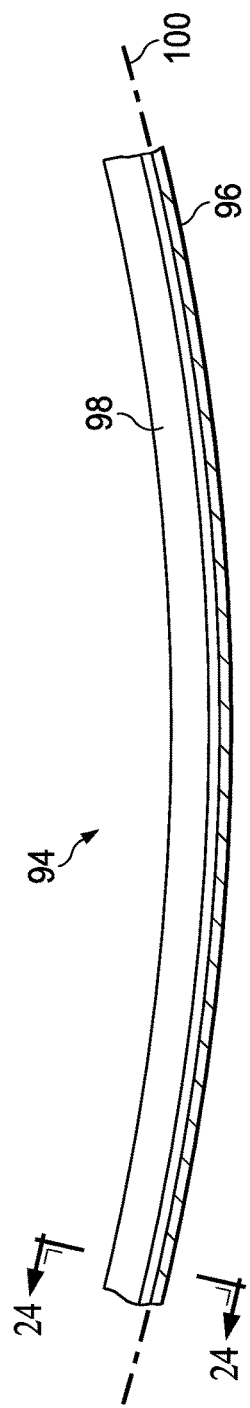
FIG. 23 is an illustration of a fragmentary, top plan view of a curved blade stringer.
Figure 24:
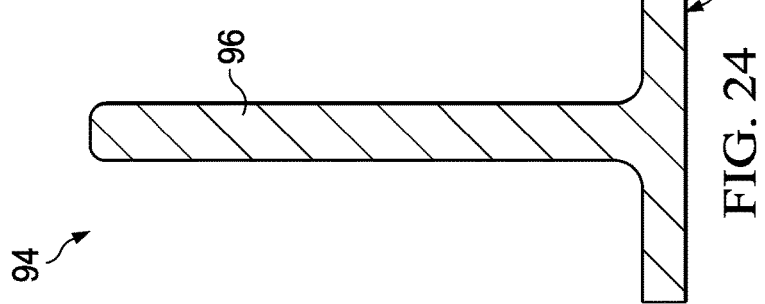
FIG. 24 is an illustration of a sectional view taken along the line 24-24 FIG. 23.

The disclosed flexible caul 30 may be used as a die tool for forming any of a variety of composite parts that have one or more contours, varying thicknesses or other non-uniformities along their length. For example, referring to FIGS. 23 and 24, the flexible caul 30 may be employed as a die to form a composite charge 104 into a blade stringer 94 comprising a flat blade 96 and a flange 98 extending perpendicular to the flat blade 96. The blade stringer 94 has a curvature in the curved plane 100 of a flange 98, and may also have a variable thickness at one or more locations along its length in order to conform the blade stringer 94 to localized contours of a structure (not shown) to which it is attached.

Figure 25:
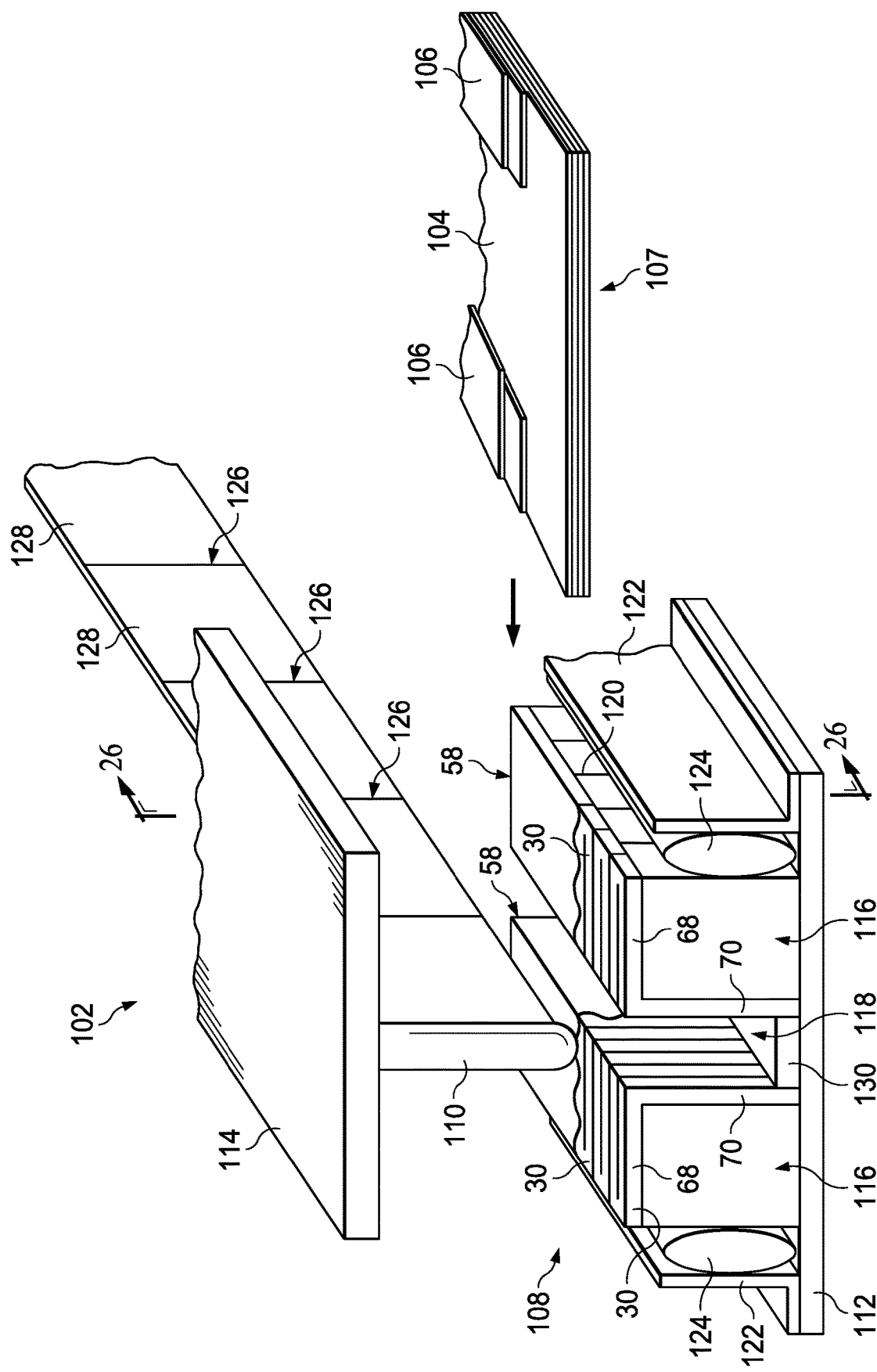
FIG. 25 is an illustration of a fragmentary, perspective view of a pair of flexible cauls installed in tooling apparatus used to form the curved blade stringer shown in FIGS. 23 and 24.
Figure 26:
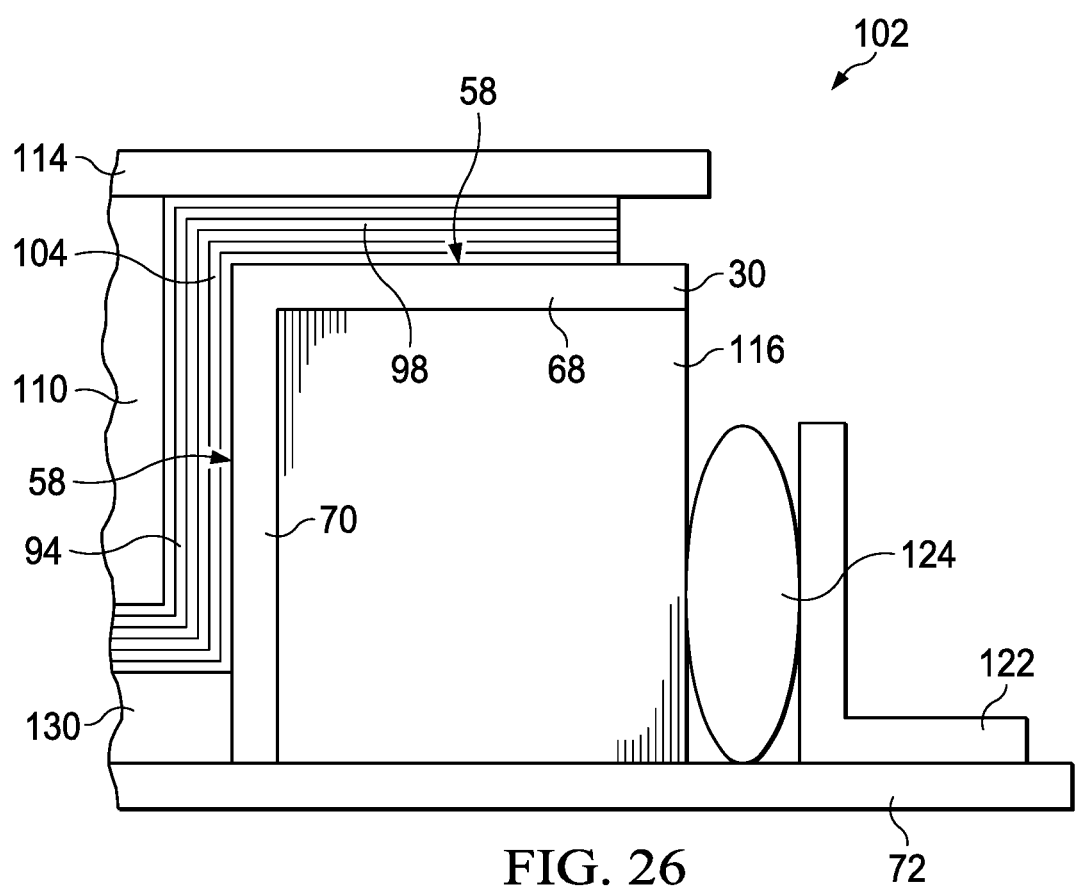
FIG. 26 is an illustration of a sectional view taken along the line 26-26 in FIG. 25, but showing a composite charge having been partially formed.

FIGS. 25-26 illustrate one form of tooling apparatus 102 that may be used in combination with the flexible cauls 30 to form the blade stringer 94 using a composite charge 104. The composite charge 104 may be flat and comprises multiple plies 107 of composite material, and may include pad-up plies 106. The tooling apparatus 102 broadly comprises a lower die 108, an upper punch 110 and a pair of flexible plates 112, 114 upon which the lower die 108 and upper punch 110 are respectively mounted. The lower die 108 comprises a pair of the flexible cauls 30 respectively mounted on a pair of die support blocks 116 that are segmented 120 along their lengths. Each of the flexible cauls 30 comprises a flange 68 and a web 70. The webs 70 of the flexible cauls 30 are spaced apart from each other to form a die cavity 118 into which the composite charge 104 can be formed. One or more bottom shims or spacers 130 may be placed within the die cavity 118, on top of the flexible 112. The die support blocks 116 and flexible cauls 30 are laterally slideable toward and away from each other on flexible plate 112. Segmentation of the die support blocks 116 allow them to flex along their lengths.

A pair of L-shape brackets 122 are mounted on and extend along the length of the flexible plate 112, on opposite sides of lower die 108. The L-shape brackets 122 function to both retain the die support blocks 116 on the flexible plate 112, and react lateral forming forces generated by the flexible cauls 30. A pair of inflatable hoses 124, sometimes referred to as bags or bladders, are sandwiched between the L-shape brackets 122 and the die support blocks 116, which are adapted to be coupled with a suitable source of pressurized air (not shown). The inflatable hoses 124 may be selectively pressurized in order to apply a lateral force on the flexible cauls 30 through the die support blocks 116 during forming and/or contouring operations. Other mechanisms, however, may be provided to apply lateral force to the die support blocks 116. The upper punch 110 is substantially flat and includes slits 126 therein that segment the upper punch 110 into a plurality of punch portions 128 which allow the upper punch 110 to flex along its length.

As previously mentioned, the blade stringer 94 may have a variable flange thickness in localized areas along its length in order to conform the blade stringer 94 to local contours of the structure to which it is attached. In order to accommodate these thickness variations so that constant pressure is evenly applied to the composite charge 104 in these localized areas, the webs 70 of the flexible cauls 30 locally flex, as necessary along their length so as to conform to the local contours caused by these thickness variations. Although not shown in the Figures, in some applications it may be necessary to place shims between the flexible plate 114 and the flanges 68 of the cauls 30. When the composite charge 104 is formed to a desired contour in a contour forming operation discussed below, both the flanges 68 and webs 70 of the flexible cauls 30 flex as necessary to maintain a constant forming pressure on the composite charge 104.

Figure 27:
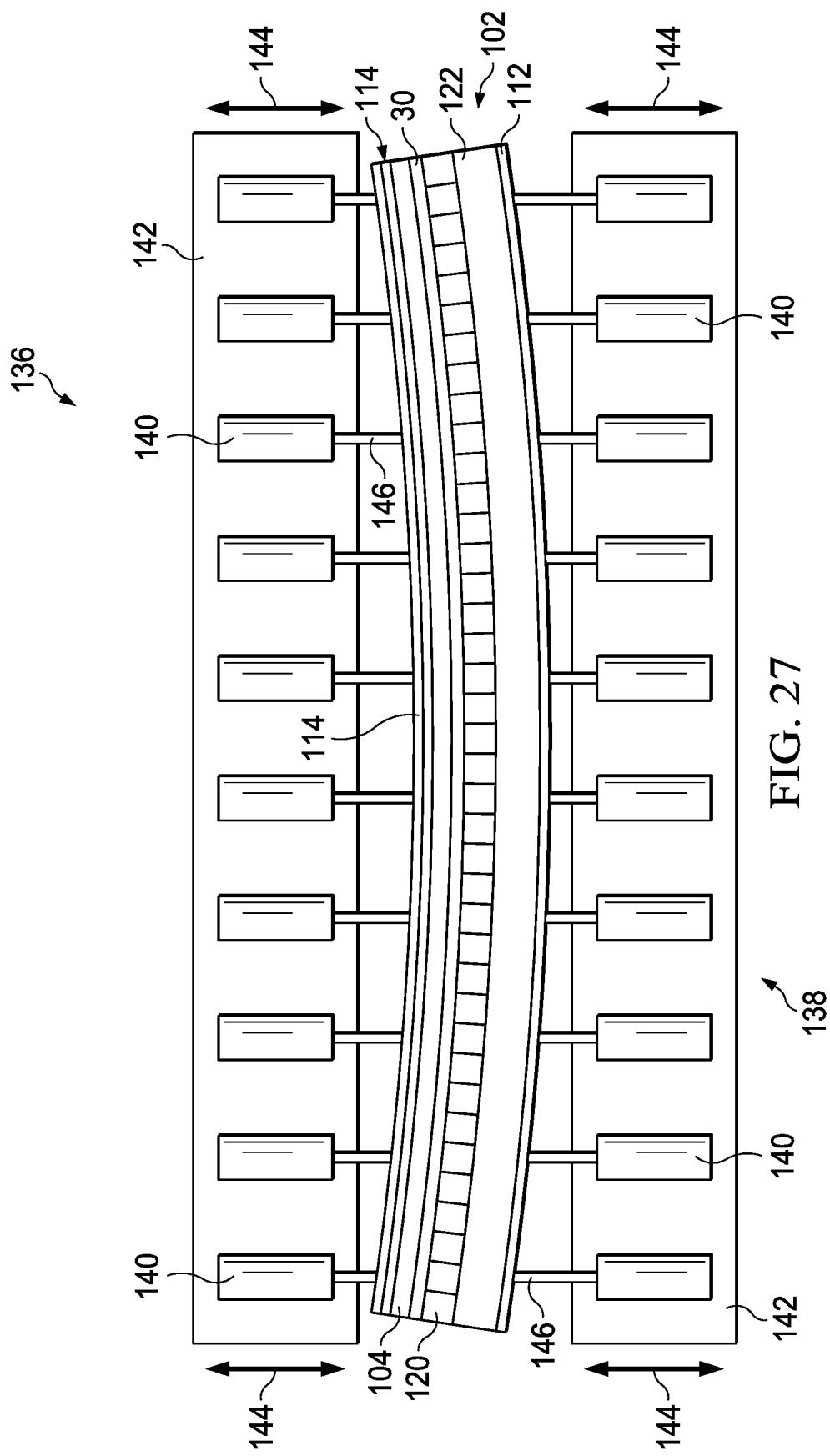
FIG. 27 is an illustration of a plan view of a die and punch contour changing mechanism employing the tooling apparatus shown in FIG. 25.

FIG. 27 illustrates a die and punch contour changing mechanism 136 incorporating the tooling apparatus 102 shown in FIGS. 25 and 26. The die and punch contour changing mechanism 136 may comprise, for example and without limitation, a press 138. A plurality of individual, spaced apart actuators 140 are respectively mounted on opposing press plates 142 that are adapted for movement toward and away from each other, indicated by the arrows 144. The tooling apparatus 102 is disposed between the press plates 142. The press plates 142 may be coupled with any suitable power operated mechanisms such as cylinder actuators (not shown) which displace the press plates 142 to open/close the tooling apparatus 102 during a charge forming operation. Each of the actuators 140 includes a plunger 146 coupled with one of the flexible plates 112, 114 that applies a force to the flexible plates 112, 114 in order to bend the flexible plates 112, 114. Bending the flexible plates 112, 114 in turn longitudinally contours the tooling apparatus 102, thereby contouring the composite charge 104 being formed. Other mechanisms may be employed to longitudinally contour the tooling apparatus.

Referring now to FIGS. 25-27, the process of forming the contoured blade stringer 94 using the tooling apparatus 102 and flexible cauls 30 previously described begins with installing the flexible cauls 30 on the die support blocks 116. Then, a composite charge 104 is loaded on top of the flexible cauls 30 while the upper punch 110 is in a raised position. The charge 104 may be heated prior to forming using a heating blanket (not shown) or by suitable other means. Next, the upper punch 110 is forced down or "punched" into the die cavity 118 between the webs 70 of the flexible cauls 30, thereby partially forming the flat blade 96 of the blade stringer 94, while the flexible plate 114 forms portions of the composite charge 104 down against the flanges 68 of the flexible cauls 30.

At this stage, the partially formed charge 104 may be contoured along its length using the contour die and punch changing mechanism 135 shown in FIG. 27 which bends the flexible plates 112, 114. As flexible plates 112, 114 bend to the desired curvature, the upper punch 110, flexible die blocks, and flexible cauls 30 each flex and conform to match the curvature of the flexible plates 112, 114. Following forming of the partially formed charge 104 to the desired curvature, the upper punch 110 is retracted from the die cavity 118, and the hoses 82 are pressurized which displaces the die support blocks 116 along with the flexible cauls 30 toward each other, thereby squeezing and fully forming the composite charge into the flat blade 96. It should be noted here that in the method example just described, contouring of the tooling apparatus 102 is performed when the charge 104 is in a partially formed state. Alternatively, however, the charge 104 may be contoured after the flat blade 95 has been fully formed.

Figure 28:
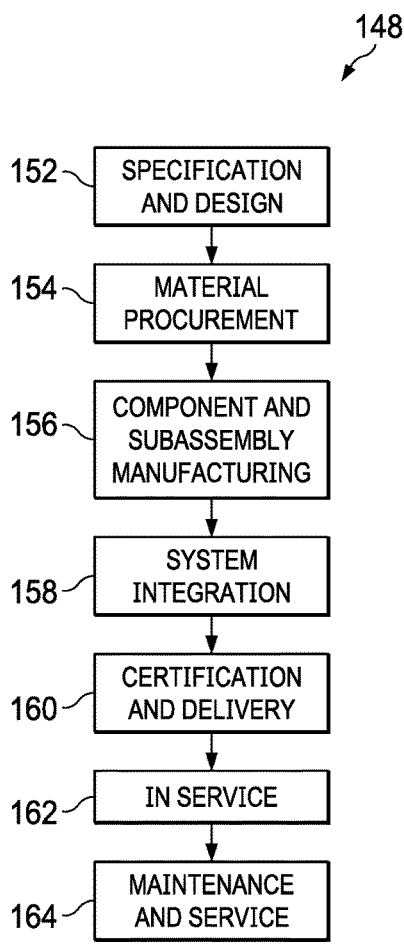
FIG. 28 is an illustration of a flow diagram of aircraft production and service methodology.
Figure 29:
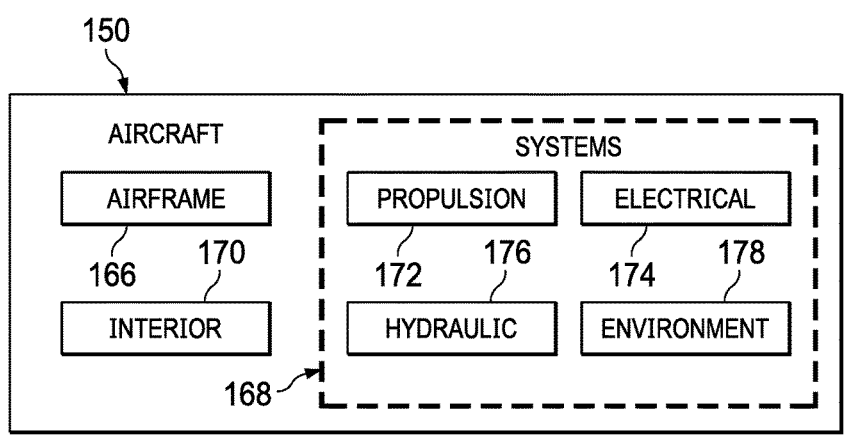
FIG. 29 is an illustration of a block diagram of an aircraft.

Examples of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 28 and 29, examples of the disclosure may be used in the context of an aircraft manufacturing and service method 148 as shown in FIG. 28 and an aircraft 150 as shown in FIG. 29. Aircraft applications of the disclosed examples may include a variety of composite parts and structures that have contours, curvatures, varying thicknesses or other non-uniformities along their lengths. During pre-production, exemplary method 148 may include specification and design 152 of the aircraft 150 and material procurement 154. During production, component and subassembly manufacturing 156 and system integration 158 of the aircraft 150 takes place. Thereafter, the aircraft 150 may go through certification and delivery 160 in order to be placed in service 162. While in service by a customer, the aircraft 150 is scheduled for routine maintenance and service 164, which may also include modification, reconfiguration, refurbishment, and so on.

Each of the processes of method 148 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 29, the aircraft 150 produced by exemplary method 148 may include an airframe 166 with a plurality of systems 168 and an interior 170. Examples of high-level systems 168 include one or more of a propulsion system 172, an electrical system 174, a hydraulic system 176 and an environmental system 178. Any number of other systems may be included. Although an aerospace example is shown, the principles of the disclosure may be applied to other industries, such as the marine and automotive industries.

Systems and methods embodied herein may be employed during any one or more of the stages of the manufacturing and service method 148. For example, components or subassemblies corresponding to production process 156 may be fabricated or manufactured in a manner similar to components or subassemblies produced while the aircraft 150 is in service. Also, one or more apparatus examples, method examples, or a combination thereof may be utilized during the production stages 156 and 158, for example, by substantially expediting assembly of or reducing the cost of an aircraft 150. Similarly, one or more of apparatus embodiments, method examples, or a combination thereof may be utilized while the aircraft 150 is in service, for example and without limitation, to maintenance and service 164.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A flexible caul for applying even compaction pressure to a part, comprising:
   a caul member configured to be placed against the part and having a plurality of spaced apart gaps therein to provide the caul member with flexibility, wherein the caul member includes a width, a length having a longitudinal centerline, a first side, and a second side opposite the first side, and wherein the spaced apart gaps extend from the first side and the second side inwardly beyond the longitudinal centerline; and
   a flexible covering encasing the caul member and configured to limit flexing of the caul member, wherein the flexible covering fills the plurality of spaced apart gaps prior to applying the pressure to the part such that the caul member comprises a substantially smooth surface to be placed against the part.

2. The flexible caul of claim 1, wherein the caul member is formed of a rigid material, has a plurality of hinged segments along its length, and is reconfigurable for use with other parts having differing geometries.

3. The flexible caul of claim 1, wherein:
   each of the spaced apart gaps is a slit having an end, and
   the caul member includes a flexible zone at the end of each slit.

4. The flexible caul of claim 3, wherein the caul member has a plurality of hinged segments along its length separated by the slits and the flexible zones.

5. The flexible caul of claim 1, wherein the caul member is a composite laminate.

6. The flexible caul of claim 1, wherein the plurality of spaced apart gaps are spaced along the entire length of the caul member.

7. The flexible caul of claim 1, wherein the plurality of spaced apart gaps comprise slits and the slits are arranged in an alternating relationship to each other along the length.

8. The flexible caul of claim 1, wherein adjacent ones of the spaced apart gaps originate from different ones of the sides.

9. A configurable tool for applying compaction pressure to a part, comprising:
   a tool member formed of a rigid material and having surfaces configured to engage the part, the tool member includes a length having a longitudinal centerline, a first side, and a second side opposite the first side, the tool member including a plurality of spaced apart gaps therein along its length, the plurality of spaced apart gaps extending from the first side and the second side inwardly beyond the longitudinal centerline and forming flexible zones to allow the tool member to flex to a desired shape; and
   a flexible material encasing the tool member and configured to fill the plurality of spaced apart gaps such that flexing of the tool member is limited, wherein the flexible material fills the plurality of spaced apart gaps prior to applying the pressure to the part such that the tool member comprises a substantially smooth surface to be placed against the part.

10. The configurable tool of claim 9, wherein each of the spaced apart gaps is a slit to allow the tool member to flex.

11. The configurable tool of claim 10, wherein each slit has an end, and each of the flexible zones forms a hinge at the end of each of the slits.

12. The configurable tool of claim 9, wherein the tool member is a composite laminate.

13. The configurable tool of claim 9, wherein the flexible material is an elastomer and covers the tool member.

14. The configurable tool of claim 9, wherein each of the flexible zones is located at an end of each spaced apart gap of the plurality of spaced apart gaps.

15. The configurable tool of claim 9, wherein adjacent ones of the spaced apart gaps originate from different ones of the sides.

16. A method of making a flexible tool for applying compaction pressure to a part, comprising:
   producing a tool member formed of a rigid material, the tool member having a length defining a longitudinal centerline, a first side, and a second side opposite the first side;
   forming a plurality of gaps in the tool member at spaced apart locations such that the gaps allow the tool member to flex, wherein the spaced apart gaps extend from the first side and the second side inwardly beyond the longitudinal centerline; and
   encasing the tool member with a flexible material that limits flexing of the tool member, wherein the flexible material fills the plurality of gaps prior to applying the pressure to the part such that the tool member comprises a substantially smooth surface to be placed against the part.

17. The method of claim 16, wherein producing the tool member includes laying up, compacting and forming plies of a composite material.

18. The method of claim 16, wherein forming the plurality of gaps includes forming slits in the tool member at opposite sides of the tool member partially across a width of the tool member.

19. The method of claim 16, wherein forming the plurality of gaps includes forming slits in the tool member by at least one of cutting and sawing.

20. The method of claim 16, wherein covering the tool member is performed by at least one of—
   spraying the tool member with the flexible material,
   dipping the tool member in the flexible material, and
   insert-molding the tool member in the flexible material.

* * * * *